Oct. 28, 1958    J. WOODCOCK    2,857,705
BAIT DISPENSER
Filed June 28, 1954
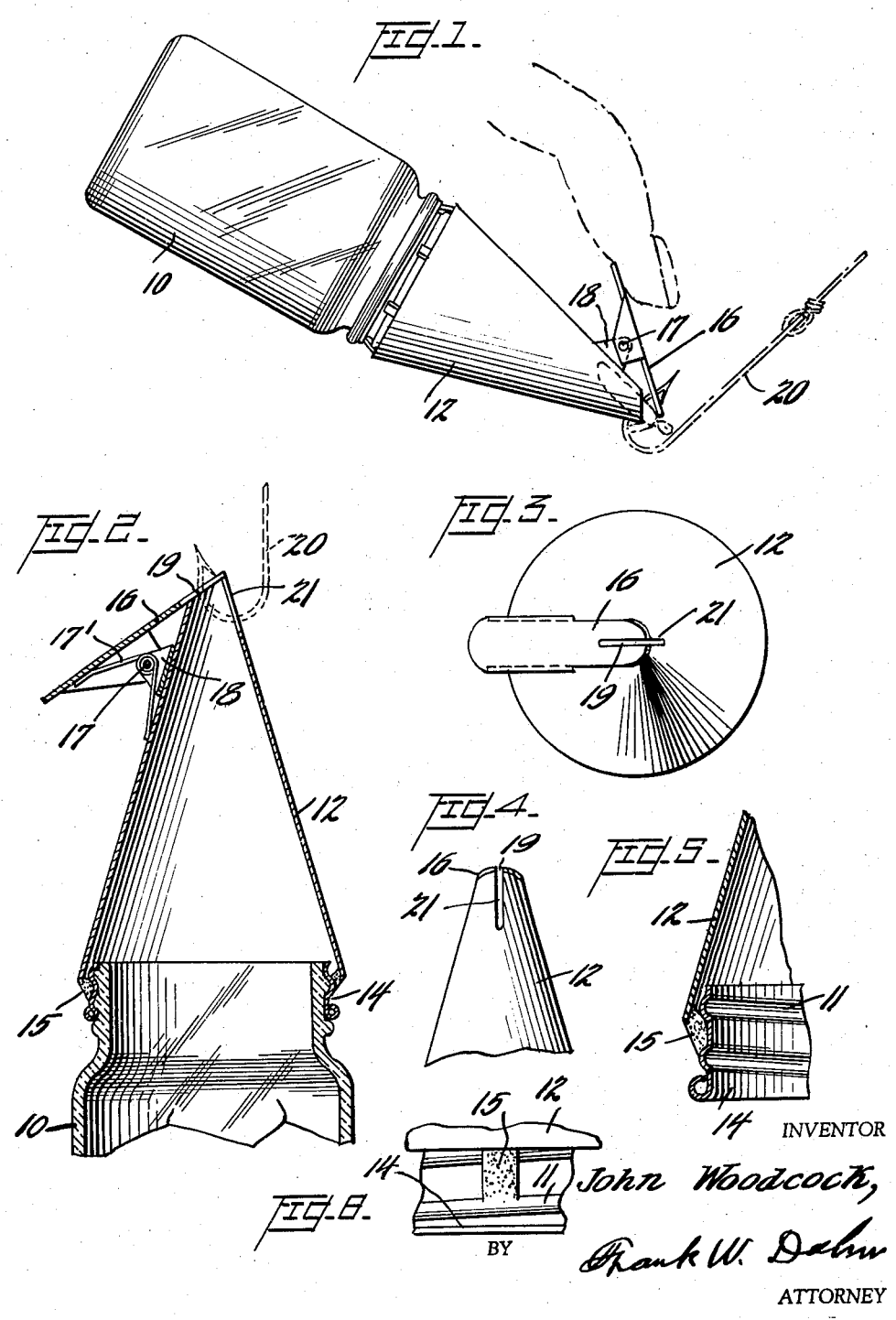
INVENTOR
John Woodcock,
BY Frank W. Dahn
ATTORNEY

United States Patent Office 2,857,705  
Patented Oct. 28, 1958

2,857,705

BAIT DISPENSER

John Woodcock, Little Rock, Ark., assignor, by mesne assignments, of fifty percent to said John Woodcock and Neal Peebles, Searcy, Ark.

Application June 28, 1954, Serial No. 439,567

1 Claim. (Cl. 43—55)

My invention relates to a bait dispenser for use by anglers, and it is an object of the same to provide convenient means for preserving and dispensing such bait as roaches and crickets, though the invention is not limited to such bait, but may be used to contain and dispense any variety of bait for which it is found to be adapted.

Fishing is enjoyed by many persons who object to contact with insects and other bait that is wet or slimy or is otherwise objectionable to a fastidious person, or which may be unsuited for contact with the bare hand for various reasons, and it is another object of my invention to provide and disclose means for holding insects or other items of bait securely in position for placement on a fishhook but without any contact with the person of the fisherman.

Another object of the invention is to hold the bait motionless while a hook is inserted therein.

Another object of the invention is to segregate a single item or piece of bait and hold the same in position to be pierced by the fishhook.

Other objects and advantages of my invention will appear to those skilled in the art of fishing, upon consideration of the subjoined specification and the appended claim. Referring now to the annexed drawings, which are made a part of this application and in which similar reference characters indicate similar parts;

Fig. 1 is a side elevation illustrating the device of my invention and its mode of use, Fig. 2, a partial central vertical section of the same, Fig. 3, a top plan, Fig. 4, a fragment showing a clamp that forms part of the invention, Fig. 5, a section through the lower end of the conical top member and the metal ring, illustrating the joint between said parts, and Fig. 6, a figure further illustrating the connection between the conical member and the ring.

In the drawing, reference character 10 indicates generally a jar which may be any suitable container, preferably being made of transparent material such as ordinary glass in order that the contents may be readily viewed and being provided with ordinary external screw threads adjacent the open mouth thereof. A conical-shaped top member 12 is provided with a depending metal ring 14 which is connected to the top member in spaced concentric relationship by solder joints 15 disposed at regular intervals around the periphery of the metal ring and the base of the top member to provide openings for ventilation between the top 12 and ring 14. The metal ring 14 is provided with internal screw threads 11 for connecting the top 12 to the container 10. It will be understood, however, that other modes of attachment of the top to the container 10 may be used, it being desirable but not essential that the top shall be readily detachable from the container but not liable to be separated therefrom by accident or inadvertence. Instead of providing the top 12 with a metal ring 14 for engaging the screw threads at the top of the container the container may be provided with a metallic threaded upper end and the top 12 may be provided with mating threads for connecting the parts together. Though it is desirable to provide spaces for ventilation between the top 12 and the ring 14 it is not necessary and the spaces may be omitted if desired.

A clamp member 16 is mounted on the top by means of a pivot 17 secured in a bracket 18 affixed to the top member 12 in any suitable manner. A spring 17' encircles the pivot and bears at one end on the outer face of the conical top member 12 and at its other end on the under face of the clamp member 16.

The clamp member 16 is slotted at its free end as shown at 19 and member 12 is slotted at 21 for insertion of a fishhook 20, as illustrated in Fig. 1, where the bait is held between the under face of part 16 and the adjacent upper margin of top member 12 so that the point of a hook may be inserted through the bait without any occasion for the angler to touch either the bait or the hook.

The mode of use is shown in Fig. 1. The bait is shaken down toward the open end of the inverted top member so that some insect or other small part of the bait protrudes through the opening at the top of cone 12 (when in normal position) and can be clamped by the clamp 16, when released. A hook being then inserted into the slot 21, through the bait, and also through slot 19 if desired or necessary, the bait being held securely in place while the hook is inserted into the same, after which the clamp 16 may be opened by pressure of the finger if necessary and the angler may proceed.

It will be obvious to those skilled in the art that many variations may be made in the device of my invention, all without departing from the spirit of the invention, and, therefore, I do not limit myself to what is shown in the drawings and described in the specification, but only as indicated in the appended claim.

Having thus fully described my invention, what I claim is:

A bait holder comprising a receptacle, a detachable frustoconical top member having a longitudinal slot in its upper end adapted to receive a hook, said member being adapted to support a bait while said bait is being impaled on the hook, said member having an inclined upper edge, and a spring-pressed clamping jaw mounted on said top member having an inclined face adapted to coact with said upper edge in clamping said bait, said inclined face having a longitudinal slot positioned in alignment with the slot in said top member whereby a fish hook passing through the aligned slots in said top member and clamping jaw will impale the bait thereon.

References Cited in the file of this patent

UNITED STATES PATENTS

| | | |
|---|---|---|
| 724,823 | Deihl | Apr. 7, 1903 |
| 731,335 | Blanchet | June 16, 1903 |
| 1,012,571 | Seifert | Dec. 19, 1911 |
| 1,489,092 | Marston | Apr. 1, 1924 |
| 1,523,612 | Sankstone | Jan. 20, 1925 |
| 1,821,288 | Beetem | Sept. 1, 1931 |
| 2,480,924 | Heger | Sept. 6, 1949 |
| 2,502,816 | Bennek | Apr. 4, 1950 |
| 2,518,590 | Andrist | Aug. 15, 1950 |